US012694236B2

(12) United States Patent
Glass et al.

(10) Patent No.: US 12,694,236 B2
(45) Date of Patent: Jul. 28, 2026

(54) NATURAL LANGUAGE DATA GENERATION USING AUTOMATED KNOWLEDGE DISTILLATION TECHNIQUES

(71) Applicant: International Business Machines Corporation, Armonk, NY (US)

(72) Inventors: Michael Robert Glass, New York, NY (US); Gaetano Rossiello, New York, NY (US); Md Faisal Mahbub Chowdhury, New York, NY (US); Alfio Massimiliano Gliozzo, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 17/957,285

(22) Filed: Sep. 30, 2022

(65) Prior Publication Data

US 2024/0111969 A1     Apr. 4, 2024

(51) Int. Cl.
   *G06F 40/30*      (2020.01)
   *G06F 3/08*       (2006.01)
   (Continued)

(52) U.S. Cl.
   CPC ............. *G06F 40/56* (2020.01); *G06N 5/022* (2013.01); *G06N 5/04* (2013.01)

(58) Field of Classification Search
   CPC .... G06F 40/211; G06F 40/253; G06F 40/268; G06F 40/284; G06F 40/30
   See application file for complete search history.

(56) References Cited

U.S. PATENT DOCUMENTS

| | | | | | |
|---|---|---|---|---|---|
| 11,003,865 | B1 * | 5/2021 | Lee | .......................... | G06F 40/56 |
| 2021/0342399 | A1 * | 11/2021 | Sisto | ...................... | G06N 3/045 |

(Continued)

OTHER PUBLICATIONS

Yang et al., title={Is retriever merely an approximator of reader?}, journal={arXiv preprint arXiv:2010.10999}, journal={arXiv preprint arXiv:2010.10999}, pp. 1-12 (Year: 2020).*

(Continued)

*Primary Examiner* — Lamont M Spooner
(74) *Attorney, Agent, or Firm* — Ryan, Mason & Lewis, LLP

(57) ABSTRACT

Methods, systems, and computer program products for natural language data generation using automated knowledge distillation techniques are provided herein. A computer-implemented method includes retrieving, in response to an input query, a set of passages from at least one knowledge base by processing the input query using a first set of artificial intelligence techniques; ranking at least a portion of the set of passages by processing the set of passages using a second set of artificial intelligence techniques; generating at least one natural language answer, in response to the input query, by processing a subset of the set of passages in connection with automated knowledge distillation techniques based on the ranking of the at least a portion of the set of passages; and performing automated actions based on the ranking of the at least a portion of the set of passages and/or the at least one generated natural language answer.

20 Claims, 4 Drawing Sheets

(51) Int. Cl.
G06F 40/56 (2020.01)
G06N 5/022 (2023.01)
G06N 5/04 (2023.01)

(56) References Cited

U.S. PATENT DOCUMENTS

| | | | | |
|---|---|---|---|---|
| 2021/0390418 | A1* | 12/2021 | Mass | G06N 3/0499 |
| 2022/0156298 | A1* | 5/2022 | Mahmoud | G06F 16/9535 |
| 2022/0374459 | A1* | 11/2022 | Liu | G06F 16/337 |
| 2023/0214633 | A1* | 7/2023 | Clinchant | G06N 3/045 |
| | | | | 704/9 |
| 2023/0297624 | A1* | 9/2023 | Asano | G06F 16/3347 |
| | | | | 707/722 |
| 2023/0376401 | A1* | 11/2023 | Wang | G06F 8/65 |
| 2023/0418848 | A1* | 12/2023 | Clinchant | G06F 40/40 |
| 2024/0070403 | A1* | 2/2024 | Meng | G06F 16/3329 |
| 2024/0241902 | A1* | 7/2024 | Shalmashi | G06F 16/35 |

OTHER PUBLICATIONS

Glass et al., title={Robust retrieval augmented generation for zero-shot slot filling}, journal={arXiv preprint arXiv:2108.13934}, pp. 1-11, (Year: 2021).*

Chen et al., title={Out-of-domain semantics to the rescue! zero-shot hybrid retrieval models}, booktitle={European Conference on Information Retrieval}, pp. {95-110}, organization={Springer}, Jan. 2022 (Year: 2022).*

Wang et al., Wang, BERT-based Dense Retrievers Require Interpolation with BM25 for Effective Passage Retrieval, booktitle={Proceedings of the 2021 ACM SIGIR international conference on theory of information retrieval}, pages={317-324}, Jul. 2021 (Year: 2021).*

Kim et al., Kim, Multitask Fine-Tuning for Passage Re-Ranking Using BM25 and Pseudo Relevance Feedback, journal={IEEE Access}, vol. {10}, pp. {54254-54262}, publisher={IEEE}, Apr. 2022 (Year: 2022).*

Lewis et al., 2020. Retrieval-augmented generation for knowledge-intensive nlp tasks. In Advances in Neural Information Processing Systems, vol. 33, pp. 9459-9474.

Guu et al., 2020. Realm: Retrieval augmented language model pre-training. arXiv preprint arXiv:2002.08909.

Karpukhin et al., 2020. Dense passage retrieval for open-domain question answering. In Proceedings of the 2020 Conference on Empirical Methods in Natural Language Processing (EMNLP), pp. 6769-6781.

Maillard et al., 2021. Multi-task retrieval for knowledge-intensive tasks. arXiv preprint arXiv:2101.00117.

Ren et al., "RocketQAv2: A Joint Training Method for Dense Passage Retrieval and Passage Re-ranking," arXiv preprint arXiv:2110.07367, 2021, 11 pages.

Jiao et al., "TinyBERT: Distilling BERT for Natural Language Understanding," arXiv preprint arXiv:1909.10351, 2019, 12 pages.

Hofstätter et al., "Improving efficient neural ranking models with cross-architecture knowledge distillation." arXiv preprint arXiv:2010.02666 (2020).

Lin et al., "Distilling Dense Representations for Ranking using Tightly-Coupled Teachers." arXiv preprint arXiv:2010.11386 (2020).

Lin et al., "Pretrained transformers for text ranking: Bert and beyond." arXiv preprint arXiv:2010.06467 (2020).

Padigela et al., "Investigating the successes and failures of BERT for passage re-ranking." arXiv preprint arXiv:1905.01758 (2019).

Petroni et al, NAACL (2021) KILT: a Benchmark for Knowledge Intensive Language Tasks.

* cited by examiner

FIG. 5

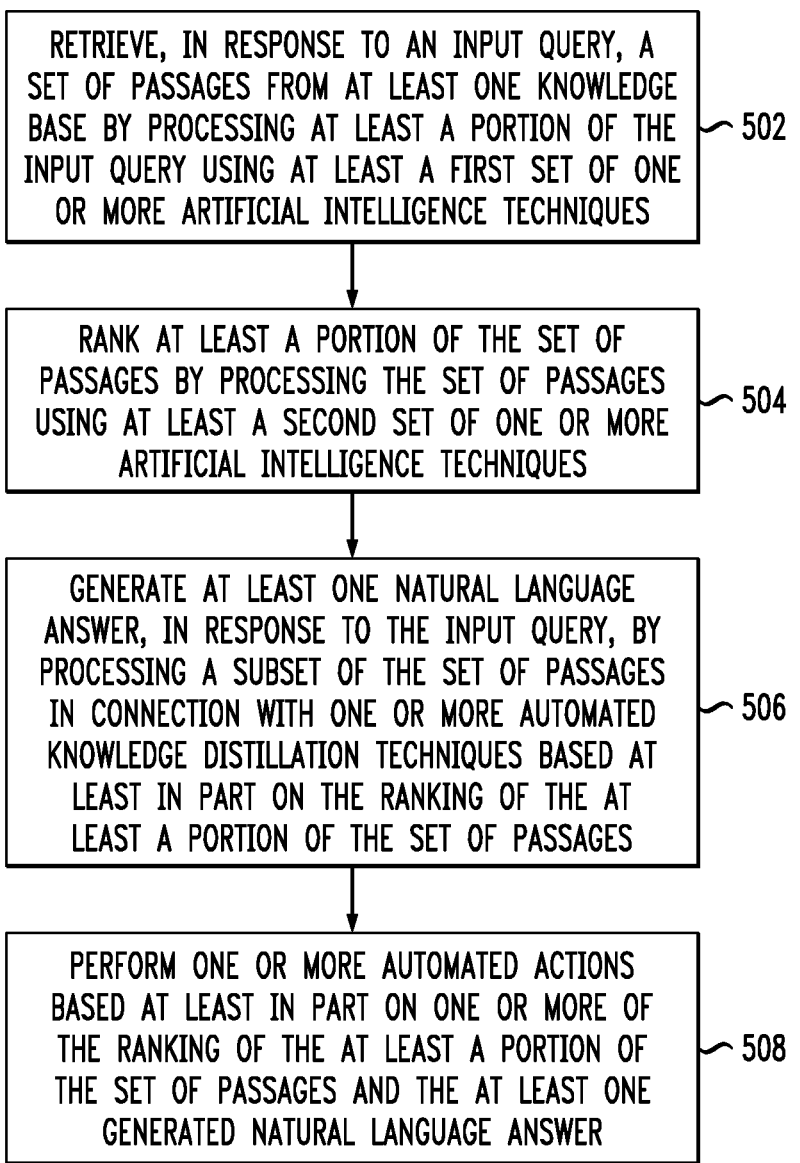

RETRIEVE, IN RESPONSE TO AN INPUT QUERY, A SET OF PASSAGES FROM AT LEAST ONE KNOWLEDGE BASE BY PROCESSING AT LEAST A PORTION OF THE INPUT QUERY USING AT LEAST A FIRST SET OF ONE OR MORE ARTIFICIAL INTELLIGENCE TECHNIQUES ⌐502

RANK AT LEAST A PORTION OF THE SET OF PASSAGES BY PROCESSING THE SET OF PASSAGES USING AT LEAST A SECOND SET OF ONE OR MORE ARTIFICIAL INTELLIGENCE TECHNIQUES ⌐504

GENERATE AT LEAST ONE NATURAL LANGUAGE ANSWER, IN RESPONSE TO THE INPUT QUERY, BY PROCESSING A SUBSET OF THE SET OF PASSAGES IN CONNECTION WITH ONE OR MORE AUTOMATED KNOWLEDGE DISTILLATION TECHNIQUES BASED AT LEAST IN PART ON THE RANKING OF THE AT LEAST A PORTION OF THE SET OF PASSAGES ⌐506

PERFORM ONE OR MORE AUTOMATED ACTIONS BASED AT LEAST IN PART ON ONE OR MORE OF THE RANKING OF THE AT LEAST A PORTION OF THE SET OF PASSAGES AND THE AT LEAST ONE GENERATED NATURAL LANGUAGE ANSWER ⌐508

NATURAL LANGUAGE DATA GENERATION USING AUTOMATED KNOWLEDGE DISTILLATION TECHNIQUES

BACKGROUND

The present application generally relates to information technology and, more particularly, to data processing techniques. More specifically, language-related data processing faces numerous challenges such as, for example, challenges pertaining to retrieval tasks. For instance, conventional language processing approaches commonly attempt to perform retrieval tasks via a static individual action, often resulting in errors and/or inaccuracies.

SUMMARY

In at least one embodiment, techniques for natural language data generation using automated knowledge distillation techniques are provided. An example computer-implemented method includes retrieving, in response to an input query, a set of passages from at least one knowledge base by processing at least a portion of the input query using at least a first set of one or more artificial intelligence techniques. The method also includes ranking at least a portion of the set of passages by processing the set of passages using at least a second set of one or more artificial intelligence techniques, and generating at least one natural language answer, in response to the input query, by processing a subset of the set of passages in connection with one or more automated knowledge distillation techniques based at least in part on the ranking of the at least a portion of the set of passages. Additionally, the method further includes performing one or more automated actions based at least in part on one or more of the ranking of the at least a portion of the set of passages and the at least one generated natural language answer.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a flow diagram illustrating techniques according to an example embodiment of the invention.

DETAILED DESCRIPTION

Figures 1, 2:
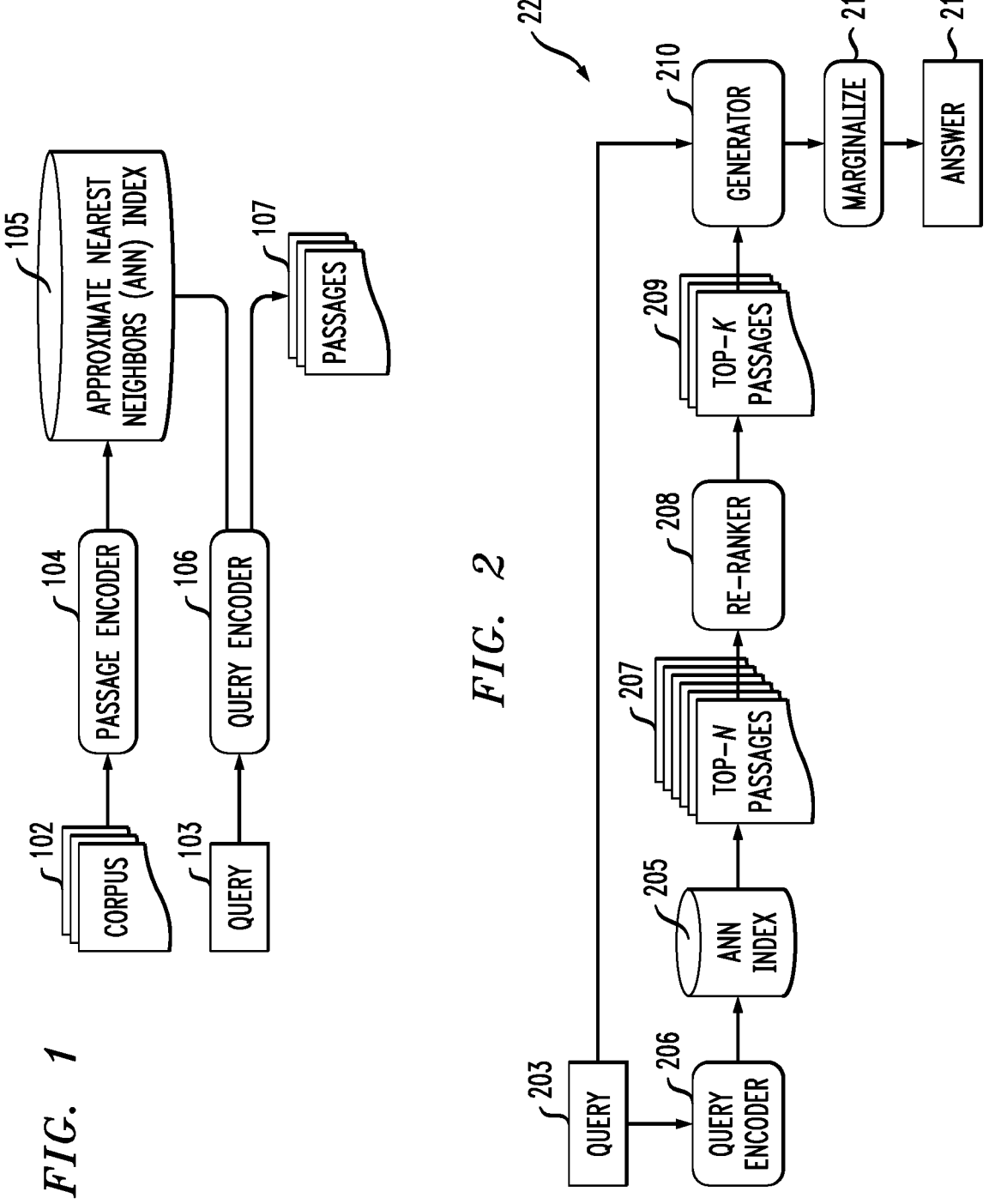
FIG. 1 is a diagram illustrating a representation model initial retrieval, according to an example embodiment of the invention.
FIG. 2 is a diagram illustrating a retrieve, re-rank, and generate (Re²G) model implementation, according to an example embodiment of the invention.

As described herein, at least one embodiment includes automated online knowledge distillation for natural language generation with retrieval and model re-training actions. For example, such an embodiment includes accessing at least one knowledge base, receiving at least one natural language question regarding and/or related to the at least one knowledge base, and generating at least one natural language answer by processing at least a portion of the at least one natural language question using one or more retrieval models. Additionally, such an embodiment can also include incorporating (e.g., using at least one computing device) knowledge distillation from the at least one natural language answer to update the knowledge base, and re-training (e.g., using the at least one computing device) the one or more retrieval models using at least a portion of the knowledge distillation. Knowledge distillation, as used herein, refers to a process whereby the predictive ability of a first model (e.g., a teacher model) is at least partially transferred to a second model (e.g., a student model). The second model can be trained to produce accurate predictions, and can also be trained to provide similar confidence values to the first model.

As further detailed herein, one or more embodiments include implementing end-to-end training of at least one retrieval augmented language model incorporating a re-ranker. The task of initial retrieval includes gathering a set of documents from a larger corpus of documents. In contrast, a re-ranker only scores the smaller set of documents, replacing the score from the initial retrieval with its own generated score. In at least one embodiment, the re-ranker scores (or "ranks," as also referred to herein) the top-N passages from an initial retrieval, facilitating the use of at least one inter-action-based model (e.g., bidirectional encoder representations from transformers (BERT)) for classification tasks (e.g., sequence-pair binary classification). In such an embodiment, the re-ranker is a pre-trained language model based on a transformer architecture (such as, for example, BERT), wherein the model can be fine-tuned for one or more re-ranking tasks.

In at least one embodiment, a re-ranker is trained using the generation task and/or language modeling task as a loss, as the passages are weighted in generation (e.g., generation of an answer to an input question, a continuation of a dialog, etc.) according to the score(s) from the re-ranker. Generation, in such an embodiment, depends at least in part on the re-ranker score(s), not the score(s) from an initial retrieval. By way of example, such a score from the re-ranker can include a probability of relevance for the given passage, trained with a cross-entropy loss. The passages can then be re-ranked by sorting on probability of relevance (e.g., sorting highest to lowest). Additionally, the gradient for the initial retrieval parameters will be zero.

In one or more embodiments, an initial retrieval component is trained through knowledge distillation of the re-ranker model. By way of example, the initial retrieval component can include at least one dense passage retrieval (DPR) model and/or at least one ColBERT model. Accordingly, in such an embodiment, the initial retrieval component can be referred to as the student model, which is trained using a re-ranker, the teacher model in this context, while the teacher model is also being trained.

Example natural language processing (NLP) models, such as, for example, retrieval augment generation (RAG) models and retrieval-augmented language (REALM) models typically implement retrieval trained through impact in generation, but only in connection with an initial retrieval. One or more embodiments include utilizing and enhancing such models by combining the results from multiple retrieval methods and implementing at least one re-ranker in connection with at least a portion of such results.

Such an embodiment includes generating and/or implementing at least one language processing model (also referred to herein as the Re$^2$G model) which includes carrying out an initial retrieval, a subsequent re-ranking, and a subsequent generation. The initial retrieval can be accomplished by processing a given set of text data and/or language data using one or more models such as, for example, a dense passage retrieval (DPR) model, a keyword search model (e.g., BM25), etc. At least a portion of the results from the initial retrieval are then scored using an interaction model re-ranker (e.g., a BERT-based model re-ranker). Subsequently, a sequence-to-sequence generation model (e.g., a denoising autoencoder such as bidirectional auto-regressive transformers (BART)) produces at least one text output.

In one or more example embodiments, implementing a Re$^2$G model begins with encoding a query into a vector for DPR retrieval. Documents with representation vectors having the highest inner product with the query vector (e.g., the top-N documents) are retrieved, for example, from an approximate nearest neighbors (ANN) index. In such an embodiment, the ANN index takes, as input, a vector and returns the documents with one or more of the nearest vectors to the input vector.

The retrieved documents are then each paired with at least a portion of the query, creating sequence-pairs for classification. In one or more embodiments, the query is paired with a passage when passed to the re-ranker model because, in order to determine if a passage is relevant for a query, the model examines both the query and the passage. These sequence-pairs are then classified as relevant or not relevant, and the logits for the relevant class are used by at least one generator as the new scores for the corresponding documents. By way of example, for a re-ranker based on BERT, the logit for each query-passage-pair is calculated by multiplying a learned weight vector by the final representation vector for the classification ([CLS]) vector in the transformer. In one or more embodiments (and as also detailed in connection with FIG. 3), at least a portion of the logits can also be used as teacher labels to train a query encoder. The loss for the query encoder can include, for example, the Kullback-Leibler (KL) divergence between the re-ranker's scores and the scores from the inner product of the query vector and document representation vector.

Additionally, and as also further detailed herein in connection with FIG. 2, there may be more documents retrieved by initial retrieval than will be ultimately used by the generator. Accordingly, at least one embodiment can include determining and/or taking the top-K documents, from among the top-N documents, to be used by the generation model (also referred to herein as the generator). In such an embodiment, the initial retrieval component is used to find N documents, which are then re-ranked and the top-K among these (K≤N) are used in generating the output.

In one or more embodiments, the query and related context information (also referred to herein as a corresponding passage) are combined into a prefix for conditional generation. In such an embodiment, each retrieved document is passed through and/or processed by a sequence-to-sequence generation model, whereby a probability distribution over the next token to generate is produced for each retrieved document. These probability distributions can then be combined and weighted using the document scores from the re-ranking model (also referred to herein as the re-ranker), thereby using the generation loss to provide a loss to the re-ranking model.

FIG. 1 is a diagram illustrating a representation model initial retrieval, according to an example embodiment of the invention. By way of illustration, FIG. 1 depicts a corpus 102 (e.g., a text data and/or language data corpus), at least a portion of which is processed by passage encoder 104. As also depicted in FIG. 1, query 103 is processed by query encoder 106. In one or more embodiments, passage encoder 104 and query encoder 106 include BERT models. Additionally, such an embodiment can include using at least one [CLS] vector, generated by passage encoder 104 to produce a vector representation for the text sequence output by query encoder 106. Accordingly, in one or more embodiments, both the query encoder 106 and the passage encoder 104 produce vectors from the [CLS] vector, such that the query and passage each have a vector.

As also depicted in FIG. 1, an ANN index 105 is used to determine and/or identify passage vectors (generated by passage encoder 104) with a sufficiently high (e.g., meeting and/or exceeding a predetermined threshold value) inner product with the query vector (generated by query encoder 106). Based at least in part on such a determination and/or identification, corresponding passages 107 are selected and/or output.

FIG. 2 is a diagram illustrating a Re$^2$G model 226 implementation, according to an example embodiment of the invention. By way of illustration, FIG. 2 depicts a query 203, at least a portion of which is processed by query encoder 206. ANN index 205 is then used to determine and/or identify the top-N passages 207 (drawn from the corpus) corresponding to one or more query vectors (generated by query encoder 206) having a sufficiently high inner product with one or more corpus-related passage vectors (such as detailed in connection with FIG. 1, for example).

As also depicted in FIG. 2, the re-ranker 208 processes at least a portion of these top-N passages 207 from the initial retrieval, re-scores the at least a portion of the top-N passages, and returns the top-K passages 209 (i.e., wherein the top-K passages 209 are a subset of the top-N passages 207). Also, in connection with the generator 210 generating an answer 213 to query 203 based at least in part on processing the top-K passages 209 and at least a portion of query 203, a marginalization step 212 is carried out wherein the answer generation is weighted according to the re-ranker-produced scores. In one or more embodiments, the generator 210 produces the words (also referred to herein as tokens) that represent the output (e.g., answer 213). For example, given a question, the generator will produce an answer, assuming that the retrieval components are able to find and supply passages that support this answer.

In one or more embodiments, re-ranker 208 can include re-ranking passages by performing sequence-pair binary classification (e.g., using a BERT model). By way merely of example, such an embodiment can include initializing re-ranker 208 from a pre-trained BERT passage re-ranking model trained on one or more language processing datasets (e.g., MS MARCO). Additionally or alternatively, at least one embodiment can include using BART in connection with re-ranker 208. In such an embodiment, BartClassificationHead can be used to determine a weight for each context in the given generation. By way of example, the query and passage can be passed to a BART model, wherein the encoder component of the BART model is a transformer encoder (e.g., BERT). Therefore, similar to a BERT-based re-ranker, the vector corresponding to a special token can be multiplied with a learned parameter vector to produce a probability of relevance.

Figure 3:
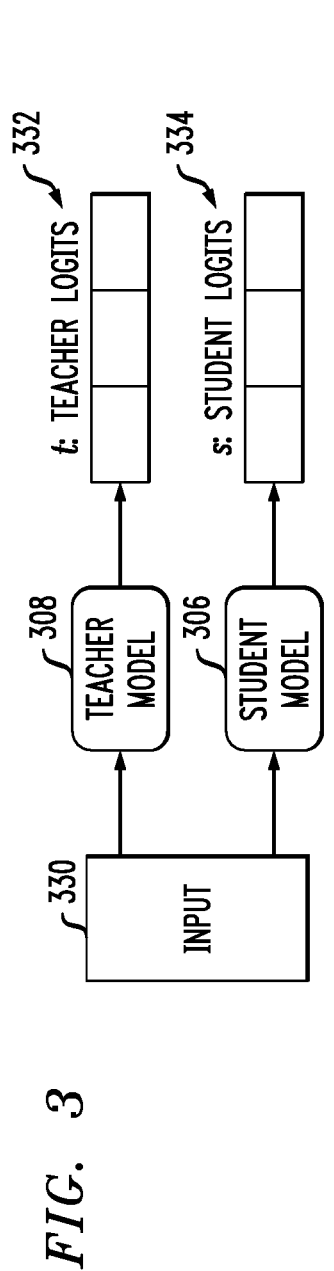
FIG. 3 is a diagram illustrating knowledge distillation, according to an example embodiment of the invention.

FIG. 3 is a diagram illustrating knowledge distillation, according to an example embodiment of the invention. In one or more embodiments (such as detailed in connection with FIG. 2 and FIG. 4), a re-ranker can be trained with the gradient from a given generation. Such an embodiment can include training the initial retrieval component (e.g., a query encoder) to generate the same score distribution as the re-ranker (encompassing knowledge distillation). As depicted in FIG. 3, such an embodiment can include providing input 330 (e.g., a query-passage-pair) to both a teacher model 308 (e.g., a re-ranker) and a student model 306 (e.g., an initial retrieval model such as a query encoder), which produce teacher logits (t) 332 and student logits (s) 334, respectively.

In such an embodiment, the loss for the student model 306 can include the KL divergence between the probability distribution that the student model 306 produces versus the probability distribution that the teacher model 308 produces, as given by Equation (1) below:

$$\text{loss} = DKL\left(\text{softmax}\left(\frac{s}{T}\right)\middle\|\text{softmax}\left(\frac{t}{T}\right)\right) \times T^2 \qquad (1)$$

wherein T is a temperature hyperparameter to smooth the probability distribution and render the training more stable. Also, in such an embodiment, the teacher model 308 is held fixed (that is, the parameters (weights) of the teacher model are not changed) while the student model 306 is trained.

Figure 4:
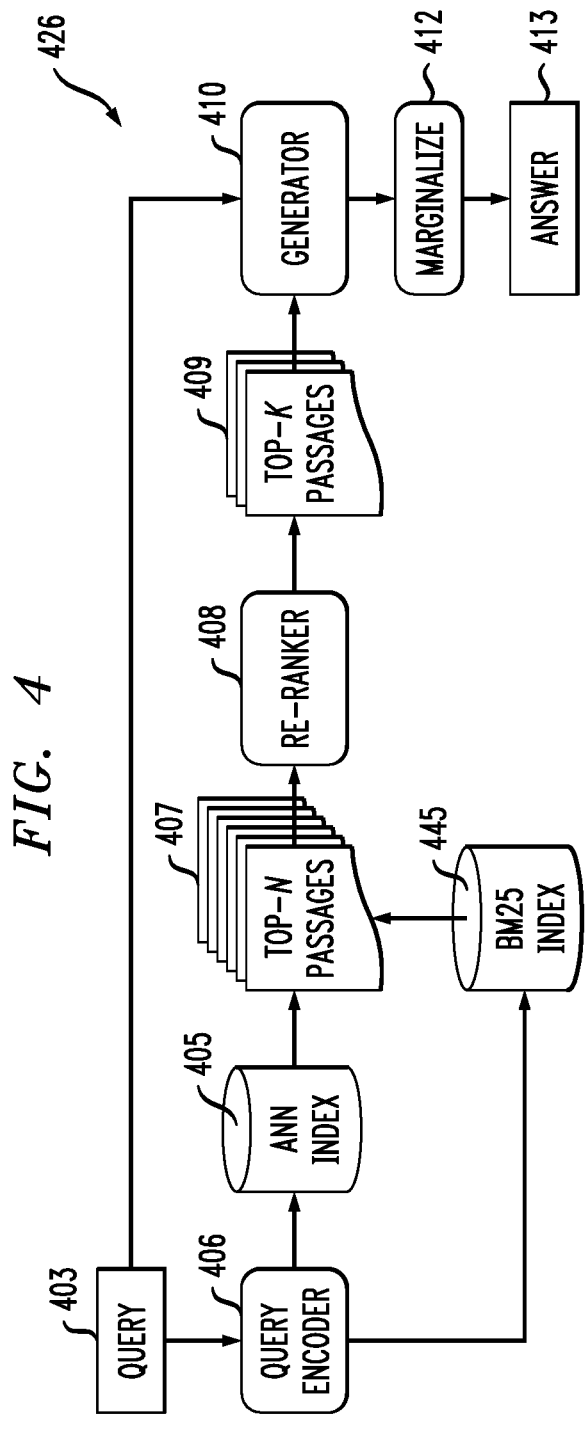
FIG. 4 is a diagram illustrating a Re²G model implementation, according to an example embodiment of the invention.

FIG. 4 is a diagram illustrating a Re$^2$G model 426 implementation, according to an example embodiment of the invention. Similar to the embodiment depicted in FIG. 2, FIG. 4 depicts a query 403, at least a portion of which is processed by query encoder 406. ANN index 405 and BM25 index 445 are then used to determine and/or identify the top-N passages 407 corresponding to one or more query vectors (generated by query encoder 406) having a sufficiently high inner product with one or more corpus-related passage vectors (such as detailed in connection with FIG. 1, for example). Accordingly, in one or more embodiments, the addition of re-ranker 408 enables multiple retrieval methods (e.g., BM25 index 445) to be combined.

As also depicted in FIG. 4, the re-ranker 408 processes at least a portion of these top-N passages 407 from the initial retrieval, re-scores the at least a portion of the top-N passages, and returns the top-K passages 409 (i.e., wherein the top-K passages 409 are a subset of the top-N passages 407). Also, in connection with the generator 410 generating an answer 413 to query 403 based at least in part on processing the top-K passages 409 and at least a portion of query 403, a marginalization step 412 is carried out wherein the answer generation is weighted according to the re-ranker-produced scores.

As depicted in FIG. 4 and further detailed herein, in one or more embodiments, the re-ranker 408 can use passages aggregated from multiple retrieval methods (e.g., via ANN index 405 and via BM25 index 445). Also, in such an embodiment, gradient from online knowledge distillation is used to train the query encoder 406, while gradient from the generation is used to train the generator 410 and the re-ranker 408.

FIG. 5 is a flow diagram illustrating techniques according to an embodiment of the present invention. Step 502 includes retrieving, in response to an input query, a set of passages from at least one knowledge base by processing at least a portion of the input query using at least a first set of one or more artificial intelligence techniques. In at least one embodiment, retrieving the set of passages includes processing at least a portion of the input query using one or more of at least one dense passage retrieval model and at least one artificial intelligence-based keyword search model. Additionally or alternatively, retrieving the set of passages can include processing at least a portion of the input query using the a first set of one or more artificial intelligence techniques in conjunction with at least one approximate nearest neighbors index.

Further, in at least one embodiment, retrieving the set of passages can include encoding at least a portion of the input query into one or more vectors, identifying each vector from the one or more vectors having an inner product-related value above a given threshold value, and retrieving a passage, corresponding to each identified vector, from the at least one knowledge base.

Step 504 includes ranking at least a portion of the set of passages by processing the set of passages using at least a second set of one or more artificial intelligence techniques. In one or more embodiments, ranking at least a portion of the set of passages includes processing the set of passages using at least one bidirectional encoder representation from a transformers-based model. Also, in at least one embodiment, the first set of one or more artificial intelligence techniques and the second set of one or more artificial intelligence techniques each include at least one identical artificial intelligence technique.

Step 506 includes generating at least one natural language answer, in response to the input query, by processing a subset of the set of passages in connection with one or more automated knowledge distillation techniques based at least in part on the ranking of the at least a portion of the set of passages. In at least one embodiment, generating at least one natural language answer includes processing the subset of the set of passages using at least one sequence-to-sequence generation model. In such an embodiment, the at least one sequence-to-sequence generation model can include at least one bidirectional auto-regressive transformer.

Additionally, in at least one embodiment, processing a subset of the set of passages in connection with one or more automated knowledge distillation techniques based at least in part on the ranking of the at least a portion of the set of passages includes providing at least a portion of the subset of the set of passages, using the one or more automated knowledge distillation techniques, from the at least a second set of one or more artificial intelligence techniques to the at least a first set of one or more artificial intelligence techniques, in conjunction with the at least a second set of one or more artificial intelligence techniques being trained.

Step 508 includes performing one or more automated actions based at least in part on one or more of the ranking of the at least a portion of the set of passages and the at least one generated natural language answer. In one or more embodiments, performing one or more automated actions includes automatically training the first set of one or more artificial intelligence techniques based at least in part on one or more of the ranking of the at least a portion of the set of passages. Additionally or alternatively, performing one or more automated actions can include outputting the at least one generated natural language answer to at least one user device.

Also, at least one embodiment can include providing software implementing the techniques depicted in FIG. 5 as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as Re$^2$G model code 626. In addition to code 626, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and code 626, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Figure 6:
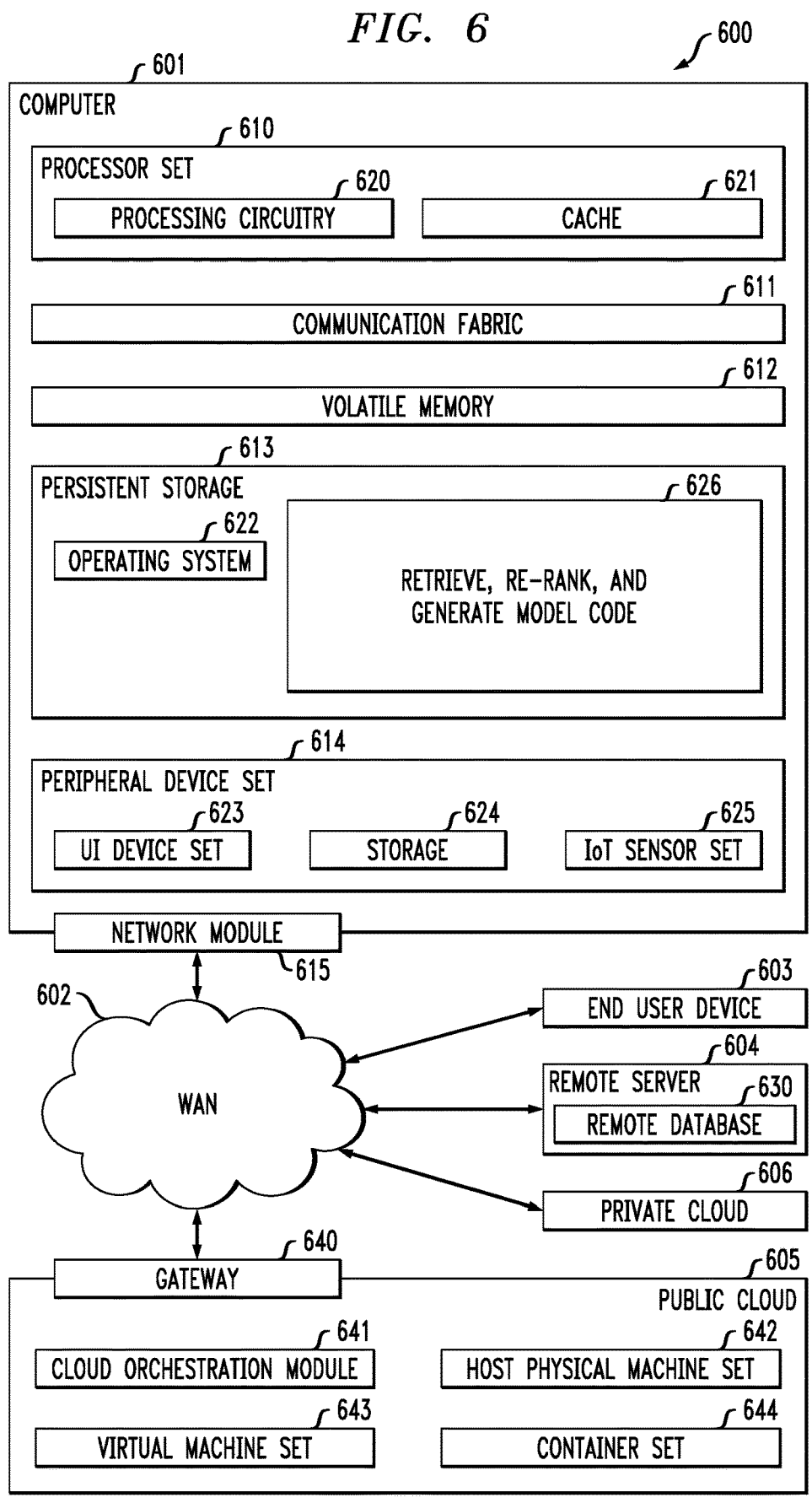
FIG. 6 is a diagram illustrating a computing environment in which at least one embodiment of the invention can be implemented.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/ or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in code 626 in persistent storage 613.

Communication fabric 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type RAM or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a ROM, but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in code 626 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

retrieving, in response to an input query, a set of passages from at least one knowledge base by processing at least a portion of the input query using at least a first set of multiple artificial intelligence techniques, wherein retrieving the set of passages comprises;

identifying at least a given number of the passages, represented in vector form, having at least a designated amount of similarity to one or more parts of the input query represented in vector form by processing at least a portion of the input query using at least one dense passage retrieval model, at least one contextualized late interaction over bidirectional encoder representations from transformers (ColBERT) model, and at least one artificial intelligence-based keyword search model; and combining, to create the set of passages, one or more portions of the at least a given number of passages identified using each of the at least one dense passage retrieval model, the at least one ColBERT model, and the at least one artificial intelligence-based keyword search model;

ranking at least a portion of the set of passages by (i) generating scores for the at least a portion of the set of passages using at least a second set of one or more artificial intelligence techniques, wherein the scores each comprise a probability of relevance value, trained with at least one cross-entropy loss, for a given passage from the at least a portion of the set of passages, and (ii) ranking the at least a portion of the set of passages in accordance with the scores;

generating at least one natural language answer, in response to the input query, by processing a subset of the set of passages in connection with one or more automated knowledge distillation techniques based at least in part on the ranking of the at least a portion of the set of passages; and performing one or more automated actions based at least in part on one or more of the ranking of the at least a portion of the set of passages and the at least one generated natural language answer;

wherein the method is carried out by at least one computing device.

2. The computer-implemented method of claim 1, wherein processing a subset of the set of passages in connection with one or more automated knowledge distillation techniques based at least in part on the ranking of the at least a portion of the set of passages comprises providing at least a portion of the subset of the set of passages, using the one or more automated knowledge distillation techniques, from the at least a second set of one or more artificial intelligence techniques to the at least a first set of multiple artificial intelligence techniques, in conjunction with the at least a second set of one or more artificial intelligence techniques being trained.

3. The computer-implemented method of claim 1, wherein ranking at least a portion of the set of passages comprises processing the set of passages using at least one bidirectional encoder representations from transformers-based model.

4. The computer-implemented method of claim 1, wherein generating at least one natural language answer comprises processing the subset of the set of passages using at least one sequence-to-sequence generation model.

5. The computer-implemented method of claim 4, wherein the at least one sequence-to-sequence generation model comprises at least one bidirectional auto-regressive transformer.

6. The computer-implemented method of claim 1, wherein performing one or more automated actions comprises automatically training the first set of multiple artificial intelligence techniques based at least in part on one or more of the ranking of the at least a portion of the set of passages.

7. The computer-implemented method of claim 1, wherein retrieving the set of passages comprises processing at least a portion of the input query using the first set of multiple artificial intelligence techniques in conjunction with at least one approximate nearest neighbors index.

8. The computer-implemented method of claim 1, wherein retrieving the set of passages comprises:

encoding at least a portion of the input query into one or more vectors;

identifying each vector from the one or more vectors having an inner product-related value above a given threshold value; and retrieving a passage, corresponding to each identified vector, from the at least one knowledge base.

9. The computer-implemented method of claim 1, wherein performing one or more automated actions comprises outputting the at least one generated natural language answer to at least one user device.

10. The computer-implemented method of claim 1, wherein the first set of multiple artificial intelligence techniques and the second set of one or more artificial intelligence techniques each comprises at least one identical artificial intelligence technique.

11. The computer-implemented method of claim 1, wherein software implementing the method is provided as a service in a cloud environment.

12. A computer program product comprising a computer readable storage medium having program instructions embodied therewith, the program instructions executable by a computing device to cause the computing device to:

retrieve, in response to an input query, a set of passages from at least one knowledge base by processing at least a portion of the input query using at least a first set of multiple artificial intelligence techniques, wherein retrieving the set of passages comprises:

identifying at least a given number of the passages, represented in vector form, having at least a designated amount of similarity to one or more parts of the input query represented in vector form by processing at least a portion of the input query using at least one dense passage retrieval model, at least one contextualized late interaction over bidirectional encoder representations from transformers (ColBERT) model, and at least one artificial intelligence-based keyword search model; and combining, to create the set of passages, one or more portions of the at least a given number of passages identified using each of the at least one dense passage retrieval model, the at least one ColBERT model, and the at least one artificial intelligence-based keyword search model;

rank at least a portion of the set of passages by (i) generating scores for the at least a portion of the set of passages using at least a second set of one or more artificial intelligence techniques, wherein the scores each comprise a probability of relevance value, trained with at least one cross-entropy loss, for a given passage from the at least a portion of the set of passages, and (ii) ranking the at least a portion of the set of passages in accordance with the scores;

generate at least one natural language answer, in response to the input query, by processing a subset of the set of passages in connection with one or more automated knowledge distillation techniques based at least in part on the ranking of the at least a portion of the set of passages; and perform one or more automated actions based at least in part on one or more of the ranking of the at least a portion of the set of passages and the at least one generated natural language answer.

13. The computer program product of claim 12, wherein ranking at least a portion of the set of passages comprises processing the set of passages using at least one bidirectional encoder representations from transformers-based model.

14. The computer program product of claim 12, wherein generating at least one natural language answer comprises processing the subset of the set of passages using at least one sequence-to-sequence generation model.

15. The computer program product of claim 14, wherein the at least one sequence-to-sequence generation model comprises at least one bidirectional auto-regressive transformer.

16. A system comprising:

a memory configured to store program instructions; and a processor operatively coupled to the memory to execute the program instructions to:

retrieve, in response to an input query, a set of passages from at least one knowledge base by processing at least a portion of the input query using at least a first set of multiple artificial intelligence techniques, wherein retrieving the set of passages comprises:

identifying at least a given number of the passages, represented in vector form, having at least a designated amount of similarity to one or more parts of the input query represented in vector form by processing at least a portion of the input query using at least one dense passage retrieval model, at least one contextualized late interaction over bidirectional encoder representations from transformers (ColBERT) model, and at least one artificial intelligence-based keyword search model; and combining, to create the set of passages, one or more portions of the at least a given number of passages identified using each of the at least one dense passage retrieval model, the at least one ColBERT model, and the at least one artificial intelligence-based keyword search model;

rank at least a portion of the set of passages by (i) generating scores for the at least a portion of the set of passages using at least a second set of one or more artificial intelligence techniques, wherein the scores each comprise a probability of relevance value, trained with at least one cross-entropy loss, for a given passage from the at least a portion of the set of passages, and (ii) ranking the at least a portion of the set of passages in accordance with the scores;

generate at least one natural language answer, in response to the input query, by processing a subset of the set of passages in connection with one or more automated knowledge distillation techniques based at least in part on the ranking of the at least a portion of the set of passages; and perform one or more automated actions based at least in part on one or more of the ranking of the at least a portion of the set of passages and the at least one generated natural language answer.

17. The system of claim 16, wherein ranking at least a portion of the set of passages comprises processing the set of passages using at least one bidirectional encoder representations from transformers-based model.

18. The system of claim 16, wherein generating at least one natural language answer comprises processing the subset of the set of passages using at least one sequence-to-sequence generation model.

19. The system of claim 18, wherein the at least one sequence-to-sequence generation model comprises at least one bidirectional auto-regressive transformer.

20. The system of claim 16, wherein retrieving the set of passages comprises processing at least a portion of the input query using the first set of multiple artificial intelligence techniques in conjunction with at least one approximate nearest neighbors index.

\*    \*    \*    \*    \*